United States Patent [19]

Clifford et al.

[11] Patent Number: 4,478,070

[45] Date of Patent: Oct. 23, 1984

[54] VACUUM PACKAGE TESTER AND METHOD

[75] Inventors: Earl W. Clifford, Getzville; John M. Perhach, Amherst; Peter S. Sorce, Tonawanda, all of N.Y.

[73] Assignee: The Aro Corporation, Bryan, Ohio

[21] Appl. No.: 440,566

[22] Filed: Nov. 10, 1982

[51] Int. Cl.³ .............................................. G01M 3/34
[52] U.S. Cl. ..................................................... 73/49.3
[58] Field of Search ................... 73/49.3; 7/45.5, 45.4, 7/37, 52, 149, 820, 714, 313

[56] References Cited

U.S. PATENT DOCUMENTS 3,646,804  3/1972  Myers ................................... 73/49.3
4,259,975  4/1981  Kinsey, Jr. et al. .................. 73/313

OTHER PUBLICATIONS

Lampi, Flexible Packages for Thermoprocessed Food, 1977.
Rizvi, Retortable Pouches, Summer, 1980.
Shappee and Werkowski, Non-Distructive Test for Determining the Volume of Air in Flexible Food Package, 6/72.
Ghosh and Rizvi, Non-Distructive Determination of Residual Volume of Air in Retort Pouches.

Primary Examiner—S. Clement Swisher
Assistant Examiner—Hezron Williams
Attorney, Agent, or Firm—Sommer & Sommer

[57] ABSTRACT

A vacuum package tester is capable of providing data by which the internal pressure and volume of residual gas of a flexible wall vacuum package exposed to atmospheric pressure may be calculated. A container partially filled with liquid is surrounded by a deformation-absorbing enclosure. A vacuum pump reduces the pressure in the head space above the liquid, thereby causing a submerged package to expand. Pressure gauges record the respective pressures in the head space when the package expands by first and second known volumes. From this data, the internal pressure and volume of residual gas of said package, when exposed to ambient pressure and temperature, may be calculated. In use, the invention also performs an improved method.

17 Claims, 1 Drawing Figure

U.S. Patent  Oct. 23, 1984  4,478,070
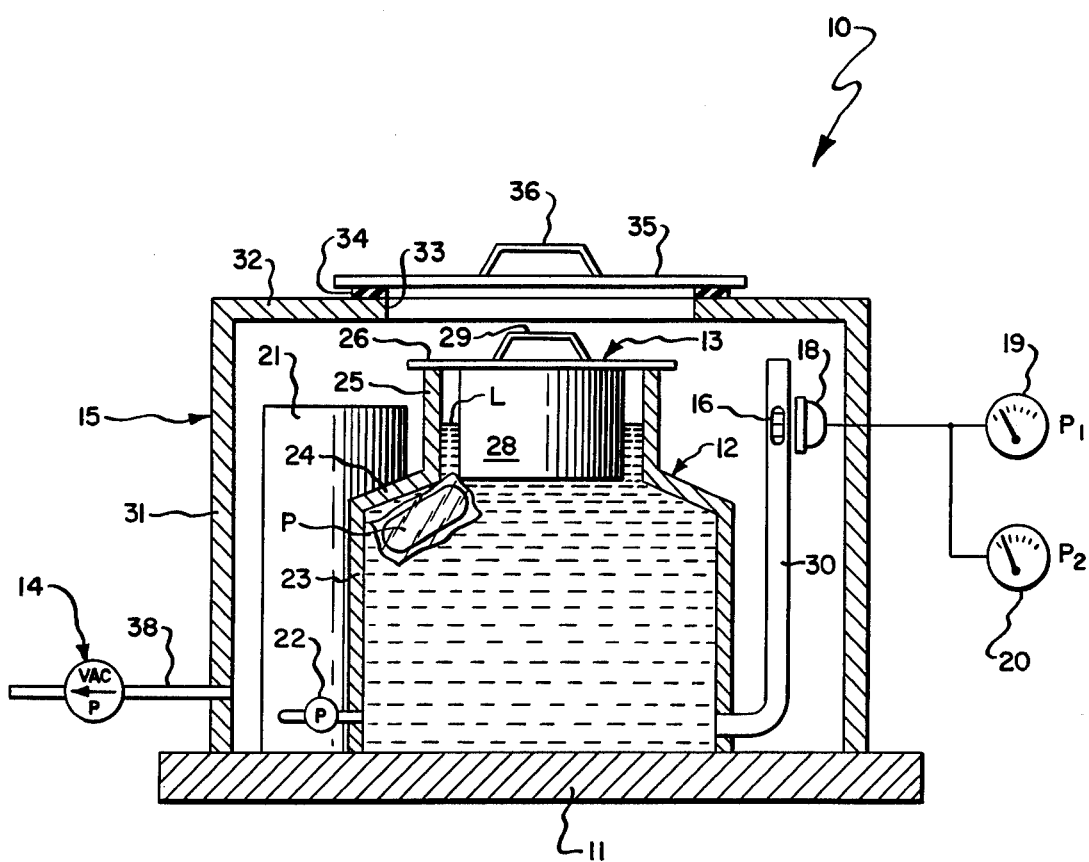

VACUUM PACKAGE TESTER AND METHOD

BACKGROUND OF THE INVENTION

1. Field of the Invention

The present invention relates generally to the field of vacuum package testers, and more particularly to improved apparatus capable of providing data by which the internal pressure and volume of residual gas of a flexible wall vacuum package, exposed to a known external pressure, may be calculated.

2. Description of the Prior Art

Flexible wall vacuum packages are widely known, and are commonly used to package perishible food products such as meat. Bacon, sausage, hot dogs and the like are often contained in such packages.

The shelf life of the food product is inversely related to the amount of residual oxygen within the package, which can promote bacteria growth. Vacuum packages, in which the flexible package wall assumes the general contour of the packaged product, were developed largely in an attempt to reduce the amount of oxygen in the package, and thereby increase the shelf life of the product. With this known technique, the product is packaged in a relative vacuum. The package may be also subjected to a shrink fit technique. The end result is that the pressure within the package is sub-atmospheric, and the pressure differential across the packaged wall causes the wall to assume the contour of the packaged article.

However, after the product has been packaged, it would be highly desirable to determine: (1) the pressure within the package; (2) the percentage of total package volume which is occupied by gas; (3) the volumetric percentage of residual oxygen within the package; and (4) the actual volume occupied by residual gas. Tested samples could indicate defects in manufacturing processes, and serve as an indicator of the product's estimated shelf life.

Prior art publications concerning such vacuum packages, sometimes called "retort pouches", and testing methods therefor, include: Rizvi, "Retortable Pouches: Food Package of the Future?", *Agri-Search*, S.C. Agricultural Research Station, Clemson University (Summer 1980); Lampi, "Flexible Packages for Thermoprocessed Foods", *Advances in Food Research*, Academic Press, New York (Vol. 23, 1977); Technical Report 73-4-GP, Shappee and Werkowski, "Study of a Nondestructive Test for Determining The Volume of Air in Flexible Food Packages", U.S. Army, Natick Laboratories, Natick, Mass. 01760 (June 1972); and Ghosh and Rizvi "Nondestructive Determination of Residual Volume of Air in Retort Pouches", South Carolina Agricultural Experiment Station, Clemson University.

SUMMARY OF THE INVENTION

The present invention provides apparatus for, and a method of, providing data by which the internal pressure and volume of residual gas of a flexible wall vacuum package, exposed to a known external pressure, may be calculated.

The apparatus broadly comprises: a container having a removable closure, the container being partially filled with a liquid; a package-to-be-tested completely submerged in the liquid, a vacuum pump operatively arranged to selectively reduce the pressure in the head space of the container above the liquid, and at least one pressure indicator operatively arranged to indicate the respective pressures in the head space when the volume occupied by the package and the liquid has increased by first and second known volumes.

In use, such apparatus performs an improved method, which broadly comprises the steps of:

Submerging a package-to-be-tested in a liquid; reducing the pressure acting on the surface of the liquid to allow the volume of the package to expand; indicating the pressure acting on the liquid surface when the volume occupied by the package and liquid has expanded by a first known volume; and indicating the pressure acting on the liquid surface when the volume occupied by the package and liquid has expanded by a second known volume.

The internal pressure of the package, when exposed to a known external pressure, may thereafter be calculated as a function of the known changes in volume and the indicated pressures.

Accordingly, the general object of the present invention is to provide improved apparatus for, and a method of, testing a flexible wall vacuum package.

Another object is to provide a method and apparatus for determining the volume of gas within such a package.

Another object is to provide a method and apparatus by which the volume of residual oxygen in such a package may be calculated.

These and other objects and advantages will become apparent from the foregoing and ongoing written specification, the drawings, and the appended claims.

BRIEF DESCRIPTION OF THE DRAWINGS

FIG. 1 is a schematic of the improved apparatus.

DESCRIPTION OF THE PREFERRED EMBODIMENTS

At the outset, it should be clearly understood that like reference numerals used herein are intended to identify the same elements and/or structure shown in the accompanying drawing, as such elements and/or structure may be further described or explained by the entire written specification of which this detailed description is an integral part.

The invention provides apparatus for, and a method of, providing data by which the internal pressure of a flexible wall vacuum package exposed to a known external pressure, may be calculated. In FIG. 1, a schematic of the presently-preferred embodiment of such apparatus is generally indicated at 10. The apparatus is shown as broadly including base 11, an inner container 12 having a removable closure cover 13, a vacuum pump 14, an outer enclosure 15, a float 16, an optical reader 18 operatively associated with recording-type first and second pressure gauges 19, 20 and a liquid reservoir 21 communicating with the interior of container 12 via an intermediate pump 22.

The base 11 is shown as being a vertically-thickened horizontal plate-like member adapted to rest on a suitable support (not shown), such as a table.

The inner container 12 has a side wall structure which includes an upstanding rectangular wall 23, the lower margin of which is suitably secured in fluid-tight relation (as by welding, fusing or bonding) to base 11, an upwardly and inwardly inclined shelf 24, and a rectangular collar 25 continuing upwardly therefrom to define an uppermost open mouth of the container. The closure cover 13 has a pair of parallel bars, one of which is indicated at 26 adapted to rest on the lip of the container's mouth, and has rectangular solid plug 28 depending therefrom into the neck of the container. Thus, the headspace of the inner container above liquid level L is continuously in communication with the space within the outer enclosure. Cover 13 is also shown as provided with a handle 29. A sight gauge 30 penetrates wall 23 and extends upwardly in parallel relation thereto. This sight gauge is open at its upper end.

The outer enclosure 15 surrounds the inner container in spaced relation thereto. The outer enclosure has an upstanding cylindrical side wall 31, the lower margin of which is suitably secured in fluid-tight relation (as by welding, fusing or bonding) to base 11, and has a horizontal circular top 32 provided with a central opening 33. A gasket 34 is mounted on the upper surface of the enclosure top to encircle opening 33. Opening 33 may be selectively closed by placement of a cooperatively-configured plate-like cover 35 against gasket 34. Cover 35 is also provided with a handle 36.

Vacuum pump 14 communicates with the interior of outer enclosure 15 via a conduit 38. When the vacuum pump is activated with both covers in place, pressure within the outer enclosure, as well as in the head space of the inner container, will be reduced to sub-atmospheric.

Reservoir tank 21 is arranged between the outer enclosure and the inner container, and communicates with the inner container via pump 22 and suitable conduits.

Float 16 is arranged in the sight gauge. The float has three vertically-spaced optically-readable marks thereon. The uppermost mark indicates that the level L of liquid in the container is at an initial reference level; the intermediate mark indicates that the volume occupied by the liquid and a package-to-be-tested has increased by a known first volume, and the lowermost mark indicates that the volume occupied by the liquid and the package-to-be-tested has increased by a second known volume. These three marks may be spaced evenly or unevenly from one another. The increase in such occupied volume causes the liquid level to rise in the space between the container neck and the plug 28, as well as in the sight gauge. The first and second known volumes may be calculated or measured by determining the volumes required to cause the liquid to rise from the first to the second marks, and from the second to the third marks, respectively.

The optical reader 18 is arranged adjacent the sight gauge and triggers an appropriate signal when a float mark is seen. Pressure gauges 19 and 20 both indicate the pressure within the outer enclosure. However, when the optical reader senses the float's middle mark, gauge 19 will stop and continue to indicate the pressure ($P_1$) within the enclosure at which such middle mark was sensed. When the optical reader senses the float's lower mark, gauge 20 will stop and continue to indicate the pressure ($P_2$) within the enclosure at which such lower mark was sensed. Thus, indicators 19,20 are recording-type pressure gauges, which may be reset after a test sequence has been completed. Lest the reader be confused, these pressure gauges will indicate the extent of vacuum (i.e., sub-atmospheric pressure), typically in familiar units of inches of mercury.

OPERATION

The illustrated structure of the preferred embodiment is deliberately schematic to minimize the possibility of obfuscating the salient features of the invention with unnecessary detail.

Assume that the pressure within enclosure 15 is initially at atmospheric pressure, and that the liquid level L is low, perhaps somewhere around the middle of the height of container wall 23. Such inner and outer pressures may be rapidly equalized by opening a vent (not shown), operation of which may be either manual or automatic. The reason for having a low initial liquid level, is so that when the package-to-be-tested is placed in the container, the liquid level will not rise to a point at which the upper mark on the float will be sensed. Between tests, pump 22 may be reversely operated to pump liquid from the container to the reservoir to reduce the liquid to the level desired. Assume also that pressure gauges 19,20 have been reset to zero, and that any vent opening has been closed.

The operator simply removes covers 35 and 13 to gain access to the inner container, places a package-to-be-tested (P) in the liquid, and replaces the two covers. Package P is of the flexible-wall vacuum type, and simply has an object, perhaps a food product, sealed within a container having a flexible wall. Such package walls may be made of plastic, paper, metal foils, combinations of these, and the like. The expression "vacuum package" refers to such packages in which the pressure within the sealed package is sub-atmospheric. Because of such relative vacuum, the package wall tends to conform to the outward shape of the object contained therein.

With the package P in the container 12, and cover 13 in place, the liquid level will rise, albeit preferably to some level still below the point at which the float's upper mark will be sensed. If the level is too high, liquid may be pumped from the container to the reservoir until the float's upper mark falls below the optical reader. Thereafter, pump 22 is operated to pump liquid from tank 21 into the container. As this occurs, the liquid level in the container, as well as the float, will rise. When the optical reader senses the float's upper mark, pump 22 is turned off. The optical reader is preferably positioned such that the liquid level will be in the neck of the container when the upper float mark is sensed.

Thereafter, vacuum pump 14 is operated to reduce the pressure within the enclosure, as well as in the ullage or head space of the inner container. Because plug 28 is held in place by two bars 26, the head space in the inner container above the liquid always communicates with the interior of the outer enclosure. In short, the pressure in such head space is always the same as that within the outer enclosure. Air is then pumped from within the outer enclosure, and the pressure acting on the surface of the liquid begins to fall. As the pressure continues to fall, the effective pressure acting on the outside of the package decreases until, at some point, such external pressure is equal to the pressure within the package. As vacuum pump 14 continues to pump air from within the enclosure, the package P will expand in volume, thereby causing the liquid level L to rise. Assuming that the liquid itself does not expand as axiomatic, the rise in liquid level must be caused by the increase in volume of the package. Indeed, the package's flexible wall will expand until a force balance is achieved. In short, during such volumetric expansion of the package, the pressure within the package must equal the pressure acting on its outer surface, for equilibrium to obtain. So long as the package remains at roughly the same place within the inner container, the pressure exerted on the package by reason of its being submerged in a liquid (i.e., $p=\rho gh$) will be substantially constant and may be compensated for.

Thus, as the pressure within the enclosure falls, the package will expand volumetrically, thereby causing the liquid level and float to rise. During the initial stages, pressure gauges 19,20 will both simultaneously indicate the falling pressure within the enclosure. In due course, the liquid level will rise until the optical reader senses the float's middle mark. When this happens, gauge 19 ceases to rise, and continues to indicate the pressure ($P_1$) at which the volumetric expansion ($V_1$) of the package caused the liquid level to rise from the float's upper mark to its middle mark. However, gauge 20 will continue to indicate the pressure within the enclosure until the optical reader senses the float's lower mark, after which gauge 20 will continue to indicate the pressure ($P_2$) at which the further volumetric expansion ($V_2$) of the package caused the liquid level to rise from the float's middle mark to its lower mark.

The pressure within the package, when exposed to atmospheric or some other known pressure, may be calculated as a function of $P_1$, $P_2$, $V_1$ and $V_2$ as follows: At a constant temperature, Boyle's Law provides that the product of pressure and volume will equal a constant. Thus, $$P_0 V_0 = P_1 V_1 = P_2 V_2$$

Initially, we do not know the volume ($V_0$) of the gas in the package when exposed to atmospheric pressure, nor the pressure ($P_0$) within the package. However, we do known the pressure ($P_1$) in the enclosure when the volume occupied by the water and the package has caused the liquid level to rise from the float's upper mark to its middle mark. This first change in volume can be either measured or calculated. Similarly, we also know the pressure ($P_2$) which causes the liquid level to rise from the float's middle mark to its lower mark. This second change in volume may also be calculated or measured. If the cross-sectional area between container wall 25 and plug 28 is constant along the height of collar 25 and the three float marks are spaced equally from one another, then the change in volumes from the upper mark to the middle mark, and from the middle mark to the lower mark, will both be equal and constant (C). Thus the volume occupied by the residual gas within the package at $P_1$ will be its original volume ($V_0$) plus a constant (C):

$$V_1 = V_0 + C$$

Similarly, the volume occupied by the residual gas within the package at $P_2$ will be its volume at $P_1$ plus a constant:

$$V_2 = V_1 + C = V_0 + 2C$$

Substituting these equations into Boyle's Law:

$$P_0 V_0 = P_1 V_1 = P_2 V_2$$
$$= P_1 (V_0 + C) = P_2 (V_0 + 2C)$$

Or, $$V_0 = \frac{C(2P_2 - P_1)}{(P_1 - P_2)}$$

Once $V_0$ has been calculated, then the pressure ($P_0$) within the package may be calculated according to the formula:

$$P_0 = \frac{P_1 V_1}{V_0} = \frac{P_1(V_0 + C)}{V_0}$$

The volume of the package ($V_p$) when exposed to atmospheric pressure may be readily measured. Once this is known, the percentage of gas in the package may be calculated as follows:

$$\% \text{ Gas} = \frac{V_0}{V_p}$$

Since air is roughly 21% oxygen ($O_2$):

$$\% O_2 = .21 \ (\% \text{ gas}) = .21 \frac{V_0}{V_p}$$

Thus, the internal pressure and volume occupied by a gas in a flexible wall vacuum package may be calculated as a function of $P_1$, $P_2$ and the two changes in volume.

MODIFICATIONS

While the disclosed embodiment is presently preferred, many changes and modifications may be made. In the preferred embodiment, the function of the outer enclosure is to insulate the inner container from deformation due to a pressure differential when air is evacuated. In this form, the pressure acting on the outer surface of the inner enclosure is equal to the pressure in its head space. This design permits the inner container to be made of materials having an economic thickness. However, if the inner container were designed so as to withstand such pressure differential without significant inward deformation as the vacuum is drawn, then it would be possible to eliminate the outer enclosure altogether, to provide a sealable cover to the inner container, and to communicate the vacuum pump with the head space of such container. The tank or liquid reservoir is also optional. Moreover, a pressure transducer, such as a suitable piezoelectric device capable of converting sensed pressure into a proportional electrical signal could be substituted for the disclosed pressure gauges. Hence, in the appended claims, the term "pressure indicator" is generally intended to cover a visual-indicating pressure gauge, or some other transducer capable of transforming sensed pressure into some proportional or analog vehicle. While the optical reader is preferred because of its ability to reduce the prospect of human error, such float positions could be determined visually or by other electrical or mechanical means. If desired, the sequence of operations may be automated so that, once a package is placed in the container, the operator need only push a button and read $P_1$ and $P_2$. Indeed, such pressure data could be supplied to a microprocessor, or equivalent, capable of performing the needed calculations. Materials of construction are not deemed critical. Auxiliary apparatus could be provided to maintain the liquid at a substantially constant temperature. The size and shape of the inner container is not critical so long as the two changes in volume may be either measured or calculated. The liquid may be water, to which a wetting agent has preferably been added, or some other liquid. The apparatus may also be used to provide data by which the internal package pressure and gas volume, when such package exposed to a known external pressure other than atmospheric, may be calculated. To do this, one need only pressurize the interior of the enclosure to the known pressure when the float upper mark is aligned with the reader at the beginning of the test.

Also, it may be desirable to continue to evacuate the outer enclosure after pressure $P_2$ has been reached, in order to insure that the package walls have completely separated from the object contained therewithin. After the package has "ballooned", it may be visually inspected for the presence of leaks if the container and enclosure are made of transparent materials, such as plexiglass.

Therefore, while the presently preferred embodiment of the inventive apparatus has been shown and described, and several possible modifications thereof discussed, persons skilled in this art will readily appreciate that various additional modifications and changes may be made without departing from the spirit of the invention, as defined and differentiated by the following claims.

What is claimed is:

1. Apparatus for providing data by which the internal pressure of residual gas in a flexible-wall vacuum package exposed to a known external pressure may be calculated, comprising:
   a container having a removable enclosure, said container being partially filled with a liquid;
   a package-to-be-tested completely submerged in said liquid;
   a vacuum pump operatively arranged to selectively reduced the pressure acting on the surface of said liquid;
   a first indicator for indicating when the volume occupied by said package has increased by a first known volume;
   a second indicator for indicating when the volume occupied by said package has increased by a second known volume; and
   at least one pressure indicator operatively arranged to indicate the respective pressures acting on the surface of said liquid when the volume occupied by said package has increased by said first and second known volumes;
   whereby the internal pressure of residual gas in said package when exposed to a known external pressure may be calculated as a function of said external pressure, said known volumes and said indicated pressures.

2. Apparatus as set forth in claim 1 wherein each of said pressure indicators is a pressure gauge.

3. Apparatus as set forth in claim 1 wherein each of said pressure indicators is a pressure transducer.

4. Apparatus as set forth in claim 1, and further comprising:
   a first pressure indicator operatively arranged to indicate the pressure acting on the surface of said liquid when the volume occupied by said package has increased by said first known volume, and
   a second pressure indicator operatively arranged to indicate the pressure acting on the surface of said liquid when the volume occupied by said package has increased by said second known volume.

5. Apparatus as set forth in claim 4 wherein said first and second pressure indicators are pressure gauges.

6. Apparatus as set forth in claim 1 and further comprising a float operatively arranged to move with the level of said liquid, said float having an upper mark thereon, and an optical device operatively associated with said float for sensing marks on said float and for indicating that the volume occupied by said package and liquid is at an initial reference level in response to the sensed proximity of said upper mark.

7. Apparatus as set forth in claim 6 wherein said float has a middle mark thereon and wherein said optical device is operatively arranged to indicate that the volume occupied by said package has increased by said first known volume in response to the sensed proximity of said middle mark.

8. Apparatus as set forth in claim 7 wherein said float has a lower mark thereon and wherein said optical device is operatively arranged to indicate that the volume occupied by said package has increased by said second known volume in response to the sensed proximity of said lower mark.

9. Apparatus as set forth in claim 1 and further comprising:
   an outer enclosure surrounding said container, said enclosure being exposed to ambient pressure on the outside thereof, the inside of said enclosure being substantially at the pressure acting on the surface of said liquid.

10. The method of providing data by which the internal pressure of residual gas in a flexible-wall vacuum package exposed to a known external pressure may be calculated, comprising the steps of:
    submerging a package-to-be tested in a liquid;
    reducing the pressure acting on the surface of said liquid to allow any residual gas in said package to expand;
    indicating the pressure acting on said liquid surface when the volume occupied by said package has expanded by a first known volume; and
    indicating the pressure acting on said liquid surface when the volume occupied by said package has expanded by a second known volume;
    thereby to provide data by which the internal pressure of residual gas in said package may be calculated.

11. The method as set forth in claim 10 and comprising the further step of:
    recording the pressure acting on said liquid surface when the volume occupied by said package has increased by said first known volume.

12. The method as set forth in claim 11 and comprising the further step of:
    recording the pressure acting on said liquid surface when the volume occupied by said package has increased by said second known volume.

13. The method as set forth in claim 10 comprising the further step of:
    calculating said internal pressure as a function of said external pressure, said known volumes and said indicated pressures.

14. The method as set forth in claim 10 comprising the further step of:
    calculating the volume of residual gas in said package according to the equation $$V_o = \frac{C(2P_2 - P_1)}{P_1 - P_2}$$

where:

V₀ = volume of residual gas in said package at pressure P₀;

C = constant;

P₁ = pressure acting on liquid surface when volume of package has increased by said first known volume; and P₂ = pressure acting on liquid surface when volume of package has increased by said second known volume.

15. The method as set forth in claim 14 comprising the further step of:

calculating the pressure of residual gas in said package according to the equation:

$$P_o = \frac{P_1(V_o + C)}{V_o}$$

where:

P₀ = pressure of residual gas in said package at volume V₀;

P₁ = pressure acting on liquid surface when volume of package has increased by said first known volume;

C = constant; and

V₀ = volume of residual gas in said package at pressure P₀.

16. The method as set forth in claim 10 comprising the further step of:

calculating the volume of residual gas in said package at an unknown internal pressure.

17. The method as set forth in claim 16 comprising the further step of:

calculating said unknown internal pressure when the residual gas in said package occupies said calculated volume.

* * * * *